United States Patent [19]

Badewitz

[11] Patent Number: 4,859,047
[45] Date of Patent: Aug. 22, 1989

[54] GLARE REDUCING NIGHT DRIVING GLASSES

[76] Inventor: Charles J. Badewitz, 1583 Calle De Andluca, La Jolla, Calif. 92037

[21] Appl. No.: 170,167

[22] Filed: Mar. 17, 1988

Related U.S. Application Data

[63] Continuation-in-part of Ser. No. 31,574, Mar. 30, 1987, abandoned.

[51] Int. Cl.[4] .......................... G02C 9/00; G02C 7/10
[52] U.S. Cl. ...................................... 351/47; 351/158; 351/165
[58] Field of Search ...................... 351/45, 47, 48, 57, 351/58, 158, 165

[56] References Cited

U.S. PATENT DOCUMENTS

| | | | |
|---|---|---|---|
| 1,637,406 | 4/1927 | Brumder | |
| 2,445,153 | 7/1948 | Rearick | 351/45 |
| 2,511,776 | 6/1950 | Kelly | 351/45 |
| 2,675,740 | 4/1954 | Barkley | 351/165 |
| 2,923,943 | 2/1960 | Rubin | 351/47 |
| 3,111,675 | 11/1963 | Mora | 351/45 |
| 3,171,134 | 3/1965 | Kennedy | 351/47 |
| 3,512,880 | 5/1970 | Alexander et al. | 351/45 |
| 3,689,136 | 9/1972 | Zayen | 351/44 |
| 4,163,607 | 8/1979 | Nanini | 351/47 |
| 4,311,368 | 1/1982 | Saito et al. | 351/165 |
| 4,338,003 | 7/1982 | Adrian | 351/44 |
| 4,470,673 | 9/1984 | Gilson | 351/44 |
| 4,678,296 | 7/1987 | Smith | 351/45 |

FOREIGN PATENT DOCUMENTS

| | | | |
|---|---|---|---|
| 0213426 | 3/1958 | Australia | 351/45 |
| 1372190 | 8/1964 | France | 351/45 |

*Primary Examiner*—Rodney B. Bovernick
*Assistant Examiner*—Jay Ryan

[57] ABSTRACT

A universal design of Glare Reducing Night Driving Glasses that may be used either with or without prescription eye glasses and does not require custom design, manufacture, or adjustment of glare reducing filters by optical professionals for each user. Rather, they are easily adjusted by the optically unskilled user. They are a separate entity from prescription eye glasses, and are comprised of:

A wide, horizontal, wrap around, uniform filter lens (incident light rejection of 3 to 6 db)

A narrow, horizontal, wrap around, linear gradient filter region which is integral with and located at the bottom edge of the uniform filter (incident light rejection (3 to 6 db)

Lenses supported on a single frame.

Glasses may be worn either with or without prescription glasses. No modifications are required to the prescription glasses.

The adaptation to prescription glasses is accomplished by the user who simply shapes a single mechanical coupler to hook over the nose bridge of the prescription glasses causing it to be of the correct length to position the lower edge of the narrow linear gradient filter to coincide approximately with the plane of the driver's horizontal-line-of-sight.

A slight head nod of just a few degrees enables the wearer to position the oncoming vehicle headlights in either the uniform filter region, the narrow linear gradient filter region, or the clear area below the filters. All of the actions may be executed by the user in a time period that approaches the time of a blink of the eye.

4 Claims, 4 Drawing Sheets

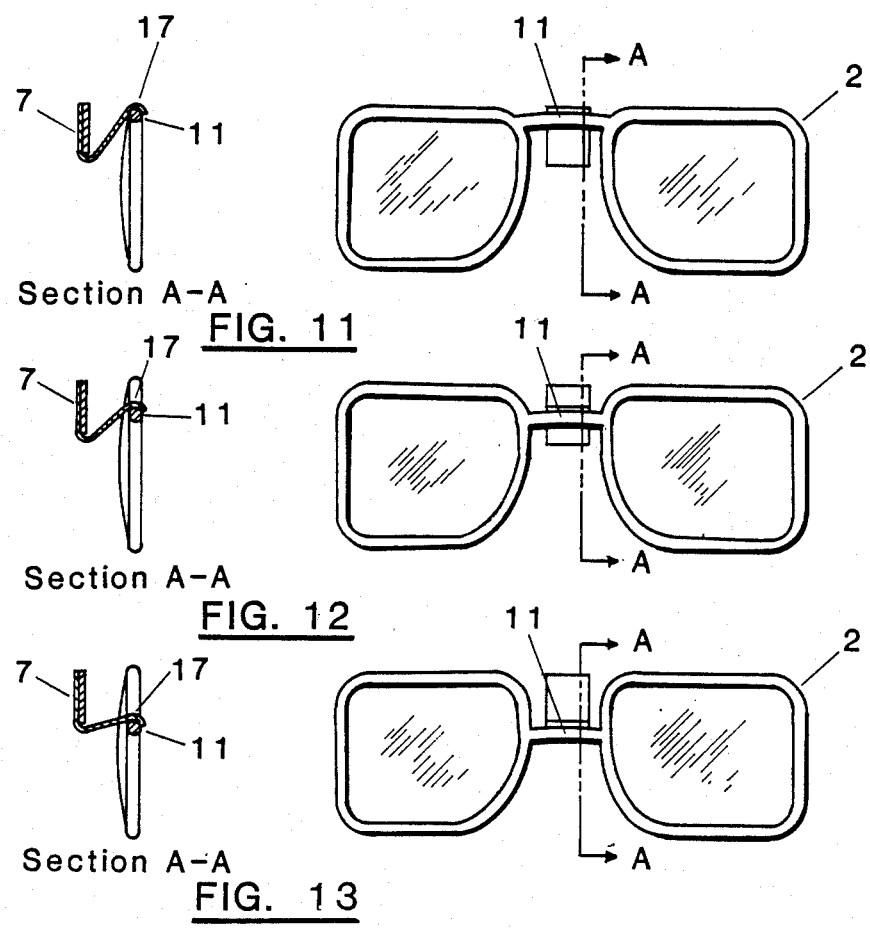
Section A-A
FIG. 11
Section A-A
FIG. 12
Section A-A
FIG. 13
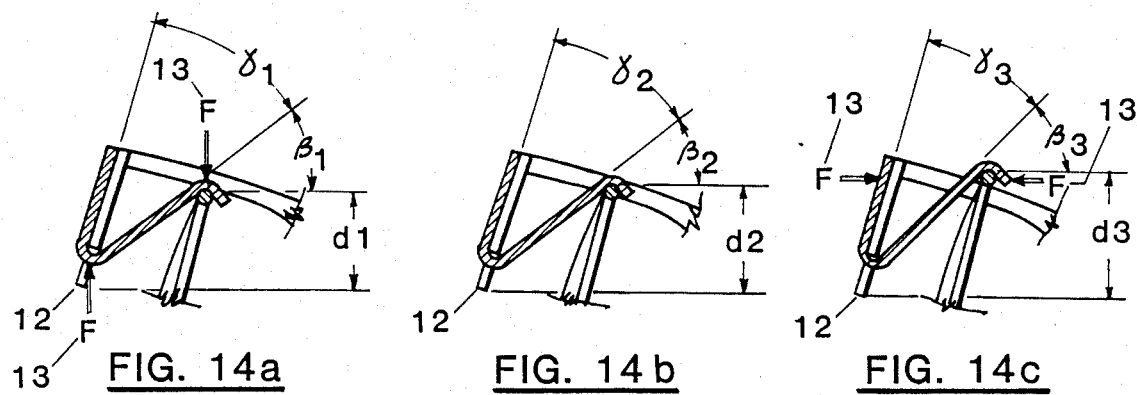
FIG. 14a   FIG. 14b   FIG. 14c

GLARE REDUCING NIGHT DRIVING GLASSES

This is a continuation in part of my original application, Ser. No. 07/031,574, filed on 30 March 1987, now abandoned.

BACKGROUND OF THE INVENTION

1. Field of the Invention

The glare from approaching vehicle headlights constitutes a long recognized source of danger, impaired night vision, fatigue, and irritation to unprotected drivers. The danger increases with extended time of driving and causes many drivers to limit or even avoid night driving entirely.

At the same time, the need to extend visibility in night time conditions is also recognized by the use of brigher headlights, wider area and extended ranges of illumination.

This contradictory sets of conditions and requirements are best resolved at the "offended driver's" eyes—by the offended driver using glare filtering as desired and controlled by the driver—without compromise of viewing and reaction time of the driver.

The general object of this invention is to equip drivers to protect themselves quickly, effectively, and nearly automatically during glare periods by a very slight head nod of several degrees to select clear or glare filtered viewing—without compromising any other driving functions. During nonglare periods, the driver has unobstructed critical night viewing capability. The transition from clear to filtered viewing and return to clear viewing may be executed in a time period approximating the time of a blink of the eye.

DESCRIPTION OF PRIOR ART

A number of attempts have been made over the last few decades to provide drivers with glare protection from oncoming vehicle headlights and a number of patents have issued. These patents employ varied approaches, and yet each fails to provide the necessary protection because each concept has not fully recognized and countered the unique characteristics of oncoming headlight glare.

First, the important characteristics of the glare will be identified, and a brief discussion given showing how the issued patents fail in glare protection and differ from this invention.

The following are critical characteristics of oncoming headlight glare:

(a) It is limited to a very narrow vertical angle (1 to 5 degrees) in the driver's plane of horizontal sight.

(b) It can appear or disappear very suddenly requiring very rapid interposition of whatever filter system is used.

(c) It varies greatly and quickly in intensity as related to oncoming vehicle, equipment condition, range, and weather conditions requiring a quickly variable filter.

(d) The incident glare to the driver is either direct, single reflection, or multi-path. More than likely a combination will be experienced.

(e) It involves both of the driver's eyes which should be treated nearly identically to avoid a type of visually induced vertigo.

(f) As the vehicles approach, the glare moves from dead ahead in the driver's view to his left. It usually disappears in a final burst of glare from the headlight sidelobes as the vehicles pass each other. Sidelobe filtering is needed.

(g) The glare effects nearly all drivers—those who wear prescription glasses and those who do not. Hence, a universal or common solution is most desirable.

(h) Finally, the driver must be able to achieve unfiltered viewing just as quickly as he interposed filtered viewing.

These requirements dictate the kind of system that is described in this invention, but which is not revealed in any of the issued patents known to this inventor. For example, (4,338,003), (3,512,880), (1,637,406), (3,689,136), (4,678,296), and (4,470,673) which follow:

(1) ADRIAN (4,338,003) offers a "peep hole" concept of full transparency surrounded by annular zones or segments of annular rings of varying light absorbtion. No provisions are made to counter a, b, c, f, g, h, above.

(2) ALEXANDER ET AL (3,512,880) offers a vertically defined partial light absorbing region (nearest a passing car) of varying light absorbtion in vertical slices. A concept earlier tried and rejected by this inventor. No provisions are made to counter a, b, c, g, h.

(3) BRUMDER (1,637,406) offers glasses with transparent upper portions, opaque bottoms, and a transparent "peephole" to obstensibly train golfers to keep their heads down when striking a golf ball—yet allowing vision through the top portion to follow the flight of the ball. No provision for a, b, c, d, e, f, g, h above.

(4) ZAVEN (3,689,136) offers wrap around sunglasses with two lenses capable of being partially or completely superposed. The purpose is to control the forward and peripheral light while skiing. No provisions or application re a, b, c, d, e, f, g, h above.

Two patents which have some similarity but fall far short of fulfilling the specifications of this invention are:

(5) SMITH (4,678,296) which issued after my patent application of 30 March 1987. Smith teaches some uniform filtering of the upper quarterspherical forward sector and some peripheral filtering, but fails completely to recognize the need for a narrow horizontal linear gradient filter (and its widening in the sidelobe glare region) which is really the most important feature of a successful system. He also fails to recognize the speed of response of the driver to choose and interpose variable filtering levels to accomodate the varying glare intensity and dynamics of driving conditions.

Smith also chooses to teach a method of applying his patterned, uniform filtering to prescription glasses, and completely neglects the need for an inexpensive, universal product which does not require the skills of optical professionals and which can be configured for either prescription glasses users or non users by the average, optically unskilled driver. In summary, Smith fails to provide for a, b, c, d, e, g, h above, nor does he provide either coarse or fine adjustment in filter vertical position or leveling while driving.

(6) GILSON (4,470,673) offers some wrap around glasses to reduce eye strain for persons spending significant time interfacing with computer terminals. The advantage of such glasses over an available filter sheet snapped in position on the terminal screens isn't apparent. His wraparound feature appears to preclude use of his glasses by those who must wear prescription glasses. Most importantly of all, Gilson completely blocks viewing in the forward upper quartersphere and peripherally by the use of translucent materials. Additionally, he employs either clear or some uniform filtering in the inferior view (lower forward quartersphere) and does not anywhere even consider variable filtering. Gilsons total thrust is so directed to computer terminal users that if they were used in driving, and the user nodded his head to gain additional filtering, his driving view would be blocked by the translucent superior view material. Additionally, Gilson fails to provide for a, b, c, d, f, g, h, and very importantly fails to provide for the necessary vertical and horizontally leveling adjustments of my invention, nor does he provide the essential transition from clear to gradient filter to uniform filter in just a few degrees of head nod—in the time of a blink of the eyes.

SUMMARY OF THE INVENTION

The object of this invention is to:

Provide an inexpensive, universal design of night driving glasses that can be used either in conjuction with prescription glasses or on a stand alone basis.

Provide the driver with a choice of glare protected viewing or clear, unfiltered viewing with a simple head nod of several degrees involving response time on the order of a blink of the eyes.

The instantaneous amount of glare filtering is controlled by head position of the driver who "nods" a uniform or linear gradient filter over the offending glare.

The optically unskilled user can easily adapts the night driving glasses to prescription eye glasses by attaching and adjusting the shape and length of a simple mechanical coupling between the night driving glasses and the prescription glasses. This eliminates the custom design, manufacture, fitting, filter location by professionals for each individual as is required for other types of equipment.

No modification or alteration of the prescription glasses is required.

The glasses may be put on or taken off with one hand while driving.

A simple, one hand, fine adjustment of the vertical location of the narrow linear gradient filter is provided and may be accomplished while the glasses are in use while driving.

A simple, one hand, adjustment of horizontal leveling of the narrow linear gradient filter for maximum left-right eye comfort is provided and may be accomplished while the glasses are in use while driving.

Unimpeded viewing of the instrument panel is retained.

The Night driving glasses are very light weight and do not compromise driver comfort.

BRIEF DESCRIPTION OF THE DRAWINGS

FIGS. 11-13 illustrate various locations of prescription eyeglass nose bridges, and how the user forms the coupler.

FIGS. 14a, b, c show various bendings of the present mechanical coupler.

DESCRIPTION OF PREFERRED EMBODIMENTS

Figure 1:
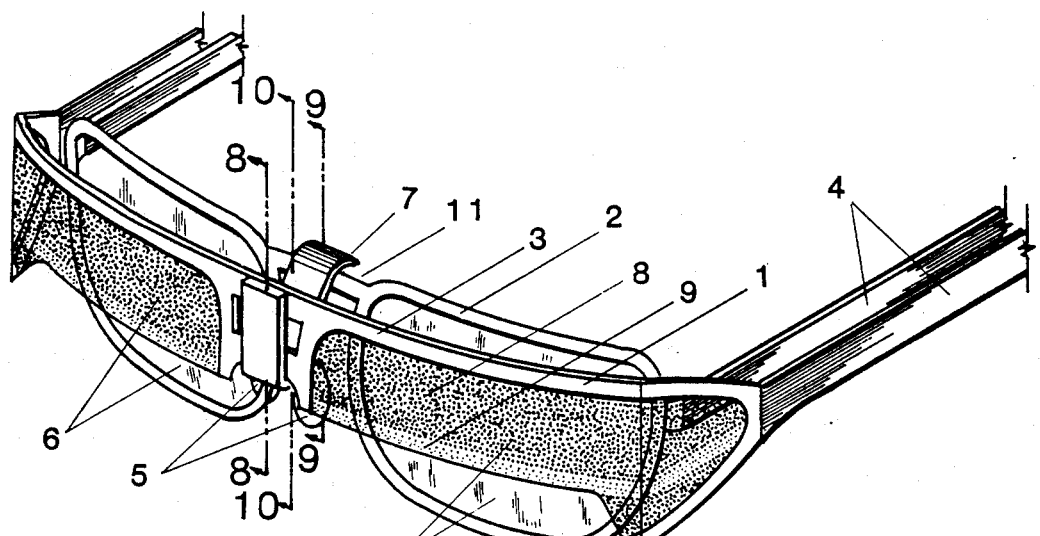
FIG. 1 shows the preferred embodiment of the present invention.

FIG. 1 represents the preferred embodiment for the universal design where drivers use the night driving glasses either in conjunction with prescription eye glasses or without prescription eye glasses. Shown are both the night driving glasses 1 and a pair of associated prescription eyeglasses 2. They are physically coupled by a mechanical coupler 7 screwed to the night driving glasses which in turn are gravitationally lodged on the prescription eyeglass nose bridge 11 and restrained by means of a hook on the free end of the mechanical coupler.

The night driving glasses are comprised of a wrap around frame 3, temples 4, nose pads 5 (used only when worn without prescription eyeglasses), filter regions 6, and a mechanical coupler 7, (which is attached to the night driving glasses and used only in conjunction with prescription eyeglasses).

Figure 4:
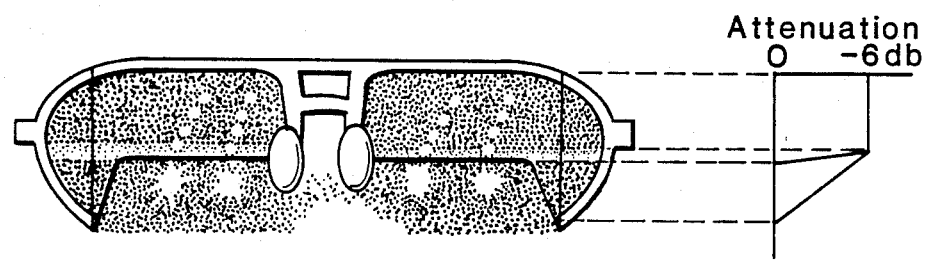
FIG. 4 illustrates relative attenuations of the filtered regions.

Each lens is comprised of two integral glare filtering regions—an upper wide horizontal strip lens of uniform glare filtering characteristics 8, and a narrow horizontal strip filter region of linear gradient filter characteristics 9. The glare filtering characteristics are plotted in FIG. 4 along the vertical axis of the uniform and gradient filter regions. Also shown in FIG. 4 is a representative users view through the glasses where all except one of oncoming vehicles headlights is in the filtering region of the night driving glasses.

The design of the preferred embodiment, which uses integral uniform and linear gradient filter regions, is so tailored to the geometric conditions and dynamics of glare encounter from vehicles that the driver need only nod his head a few degrees to position the oncoming vehicle(s) headlights in either the uniform filter region 8, the linear gradient filter region 9, or the clear region below the filter regions. These filter selections are made and implemented by the driver in a time period approaching the blink of his eye. It is a fact that these night driving glasses function as a second, artificial filtering eyelid.

Figure 2:
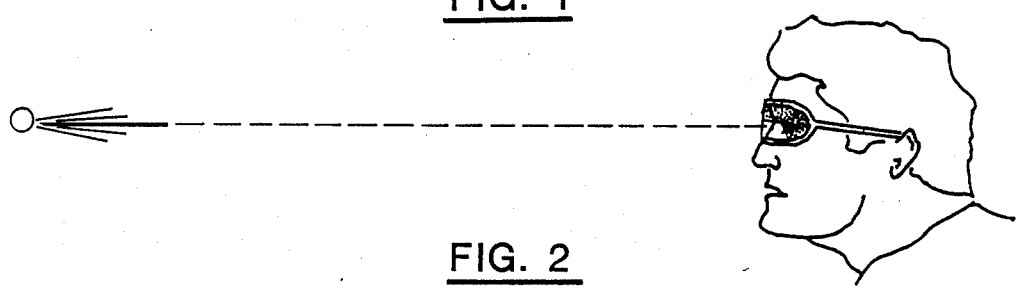
FIG. 2 depicts the head position for clear viewing.
Figure 3:
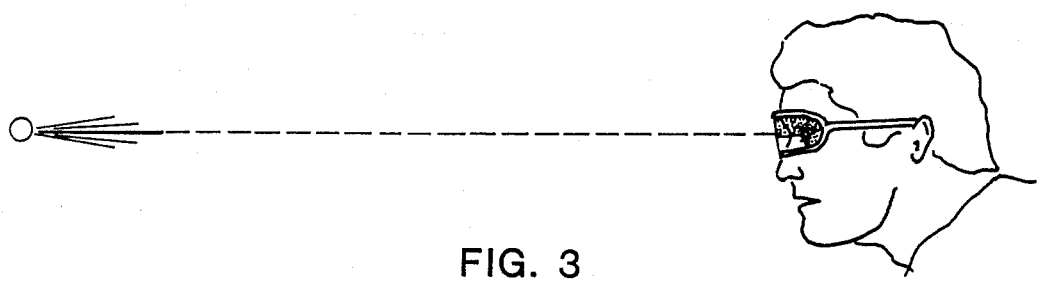
FIG. 3 depicts the head position for filtered viewing.
Figure 7:
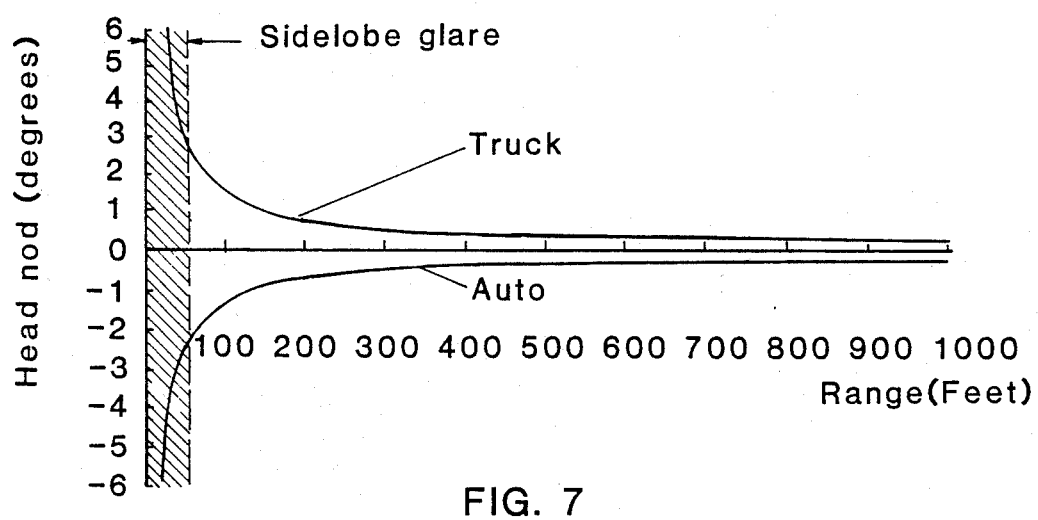
FIG. 7 quantifies the head nod angular movement as a function of oncoming vehicle range.

FIGS. 2 and 3 depict head positions (nod) for clear and filtered viewing respectively. FIG. 7 quantifies the head nod angular movement $\alpha$ as a function of oncoming vehicle range for typical automobiles and trucks.

The geometric conditions assumed in FIG. 7 are for an auto and truck whose headlights are 3 feet and 5 feet above the roadway, respectively, and at ranges, R, in feet as shown in FIG. 7. For such conditions, the head nod angle $\alpha$, is determined as:

$$\alpha = \tan^{-1} \frac{h_e - h_g}{R_{MAX}} - \tan^{-1} \frac{h_e - h_g}{R_{MIN}}$$

$h_e$ = driver's eye distance above roadway
$h_g$ = glare distance above roadway
$R_{MAX}$ = max. range between vehicles
$R_{MIN}$ = min. range between vehicles This equation, and its plot for specific conditions in FIG. 7, constitute an analytical basis for establishment of the width of the narrow, linear gradient filter lens.

For example, refer to FIG. 7 and assume a horizontal roadway, then if the driver's line of sight (head stationary) were fixed on an auto headlight glare at maximum range and followed it to minimum range, the angular vertical change of the line of sight would be approximately 4 degrees. In addition, assume the narrow gradient filter lens is one inch from the pupil of the driver's eye. As a result, the 4 degree angular change would sweep a width on the lens of approximately 0.070 inches. Doubling this to account for some of the other conditions mentioned, one conclude that a linear gradient filter width of 0.070 to 0.140 would bracket the optimum width.

During actual test without the linear gradient filter, the bottom edge of the uniform filter (0.020 thick) was radiused to 0.010. This radius caused refraction of the incident light and acted somewhat like a filter on the order of 1 degree wide. At longer ranges, it was judged effective in screening oncoming headlight glare with negligible head nodding. However, the linear gradient filter width of 0.070 to 0.140 is the preferred width.

It is assumed that the backscattering (reflection) from the oncoming headlights follows the well known laws of electromagnetic waves as relates to diffuse and specular scattering. For dry roadbeds, the backscattering is predominantly diffuse with little or no specular component. However, if the roadbed were layered with water, the specular content of backscattering would increase noticeably and probably cause the driver to increase his head nod to filter the additional glare/angle.

Figure 5:
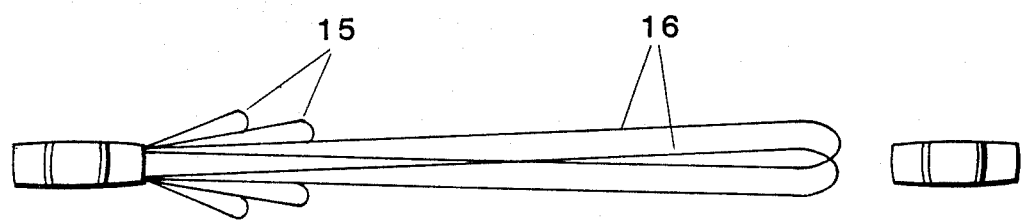
FIGS. 5 and 6 illustrate the horizontal and vertical mainlobes and sidelobe structure of approaching head lights.
Figure 6:
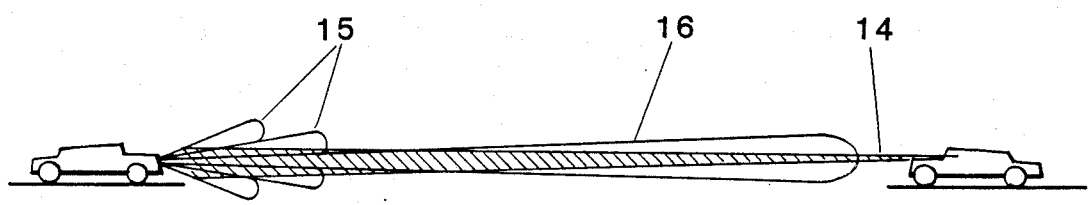

FIGS. 5 and 6 are provided to illustrate the horizontal and vertical mainlobes 16, and sidelobe 15, structure of the approaching headlights. Of significant importance to the preferred embodiment is the effective receiving beamwidth 14 of the night driver produced by the the filtering lenses which establish the small head nod angles. As the glare approaches the driver, the range reduces and the glare intensity increases but is accomodated for in the design of the filters.

At distances in excess of approximately 100 feet, the sidelobes 15 are of minor consequence. However, as the vehicles near the passing zone, the sidelobes become a recognizable glare source. For this reason, the preferred embodiment utilizes a wrap around frame and filter—with a physical widening of the linear gradient filter downward in the wrap around area.

The preferred embodiment employs a mechanical device 7 to couple the night driving glasses 1 to the prescription glasses 2. In addition to coupling the glasses comfortably for the wearer, the coupler has the inherent capability to allow single handed (two finger) adjustment of the vertical location of the bottom edge of the narrow gradient filter to lie approximately in the plane of the horizontal-line-of-sight. It also provides for single handed (two finger) horizontal leveling of the narrow linear gradient filter for maximum left-right eye comfort and efficiency.

Figure 8:
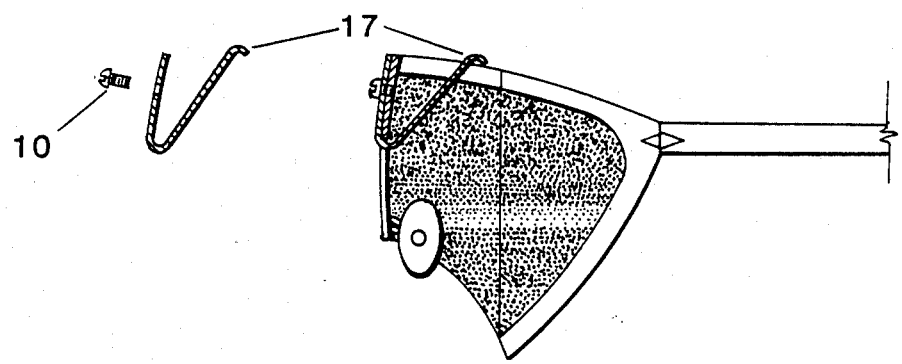
FIG. 8 shows a cross-sectional view of the present night driving glasses.

FIG. 8 shows a crossection view of the night driving glasses 1 and the coupler 7 screwed to the glasses with a small screw 10 which passes through a clearance hole in the coupler and into a drilled and tapped hole in the nosebridge of the night driving glasses. For clarity and convenience, the coupler 7 and attaching screw 10 are also shown separately.

Figure 9:
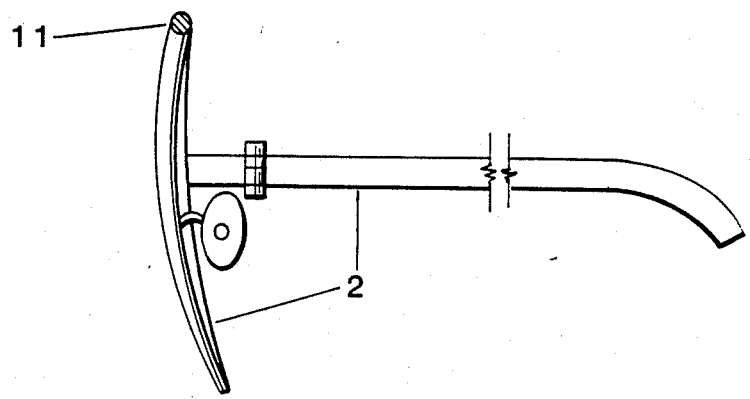
FIG. 9 shows prescription glasses.
Figure 10:
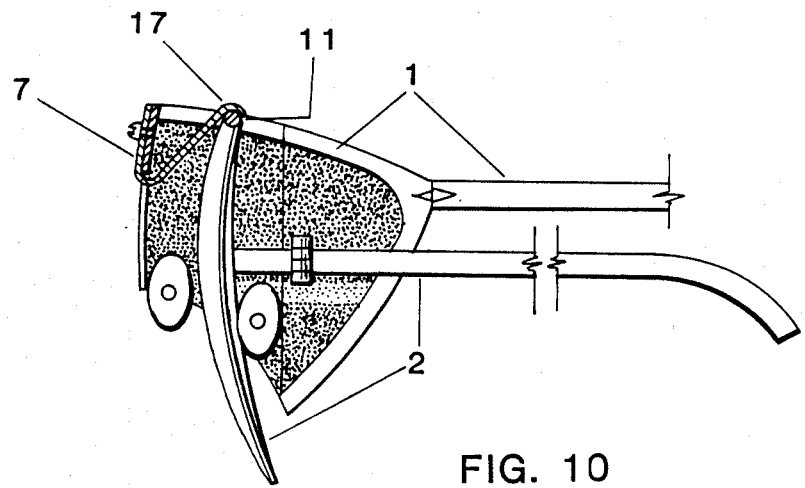
FIG. 10 shows the coupled prescription and night driving glasses.

The coupler 7 is made of a thin, soft, formable metal for reasons explained later. The end of the coupler opposite from the attaching hole has a small hook 17 (approximately 90 degree bend) formed to allow lodging and gravitational constraint to the nose bridge 11 of the prescription glasses, FIG. 9. The coupled glasses and coupler are shown in FIG. 10.

The coupler and hook is proportioned by the user and is sized so as to cause the bottom edge of the narrow gradient filter lens to approximately coincide with the plane of the user's horizontal line-of-sight. No special tools are required.

FIGS. 11, 12, 13 illustrate the various locations of prescription glasses nose bridges and how the user forms the coupler 7, to locate the narrow linear gradient filter bottom edge in the horizontal-plane-of-lines-of-sight for the various nose bridge locations.

Occasionally, the wearer may wish to move the narrow linear gradient filter 9 up or down relative to the prescription glasses, or adjust its horizontal leveling while in use. FIG. 14 illustrates how the relative vertical position is changed. FIG. 14b shows the bottom edge 12 of the narrow gradient filter 9 in the correct position as judged by its distance, d2, from the prescription glasses nose bridge 11. (it is assumed that the nose bridge 11 is in turn a constant distance from the plane of the horizontal-lines-of-sight, and is therefore useable as a reference to illustrate this adjustment)

To raise the narrow gradient filter, d2 is reduced to d1 as shown by bending the coupler to increase $\gamma 2$ to $\gamma 1$. This bending may be done while wearing the glasses and applying fingertip forces 13 as shown in FIG. 14a. To lower the narrow linear gradient filter, a similar two finger force pair is applied as shown in FIG. 14c to cause $\gamma 3$ to become less than $\gamma 2$, and d3 to consequently become greater than d2.

It is noted that the manner of adjustment actually deforms (strains) the soft metal of the coupler. Repeated adjustments could theoretically cause a cyclic stress failure of the coupler. However, the metallic material of the coupler is chosen for cyclic stress endurance as well as formability (aluminum, beryllium copper, etc) such that cyclic stress failure will not occur in normal use and lifetime.

It is also noted that the geometry of the coupler form is such that one degree of change in $\gamma$ is approximately equal to one degree of head nod angle.

The horizontal leveling of the narrow linear gradient filter is also done by one hand (two fingers) and is very simple. One temple 4 of the night driving glasses 1 is raised or lowered to pivot the night driving glasses about the contact between the coupler and the prescription glasses nose bridge until the desired leveling is achieved.

The processes for treating lenses to reduce transmitted light (glare) are established and well known. Such processes are not claimed as part of this invention. This known art is simply used. Examples of such treatment include but are not limited to:

Simms, POLARIZED GLASS LENSES, 4,549,795

Ortlieb, METHOD FOR PRODUCING OPTICAL POLARIZING ELEMENTS, 3,786,119

Mauer, THIN FILM COATING FOR SUNGLASSES, 3,516,720

Thus, the reader must perceive, that the Glare Reducing Night Driving Glasses of the invention provide selective, variable filtering of dangerous headlight glare or normal clear viewing in the time of a blink of an eye. The choice is made by the driver almost automatically by a nearly imperceptible head nod. The glasses are easily adaptable to either use with or without prescription glasses by the optically unskilled driver/user.

They are very light weight and therefore do not present a physical burden to the driver. Finally, and very importantly, the driver (with one hand) can:

(a) install them or remove them while driving.

(b) make minor vertical adjustments of the linear gradient filter for optimum glare filtering while driving.

(c) adjust the horizontal leveling of the linear gradient filter to maximize left-right eye comfort.

While my above description contains many specifications, these should not be construed as limitations on the scope of the invention, but rather as an exemplification of one preferred embodiment thereof. Many other variations are possible, for example:

(a) The lens free, clear area, immediately below the linear filter could be clear filter material.

(b) The linear gradient could be a non-linear filtering function.

(c) The mechanical coupler could be fastened to the the driving glasses in a somewhat different fashion.

Accordingly, the scope of the invention should be determined not by the embodiments illustrated, but by the appended claims and their legal equivalents.

What I claim is:

1. A set of night driving glasses or screens for reducing the glare experienced during night driving, comprising:
   (a) a frame with integral, adjustable nose pads, and temple pieces;
   (b) a lens set having a plurality of regions of different configurations and different light transmissivities;
   (c) a mechanical coupler to modify the glasses into an attachment for a set of eyeglasses, and;
   (d) said lenses are joined to the frames wherein said regions of different transmissivity are configured and located such that one region comprises a narrow horizontal strip positioned in front of the pupils of a wearers eyes by means of the mechanical coupler, and thence extend horizontally around to the sides of the wearers eyes; and wherein said narrow region varies linearly in transmissivity in a vertical direction from 100% at the lower edge to a significantly lower transmissivity at an upper edge; whilst, a region of the lens immediately above the narrow region is integral and of uniform transmissivity of the same value as the upper edge of the narrow region; and, a region of the lens immediately below the lower edge of the narrow region is void of all lens material and hence of 100% transmissivity; and,
   (e) said mechanical coupler comprises a thin strip of easily formable metal, approximately ¼ inch wide, and wherein one end comprises an array of apertures which function to attach the coupler to the driving glasses via attachment means for tightening at one of a plurality of vertical positions on eyeglass nose bridges by appropriate choice of aperture; and, for which the other end of the metal strip is formed into a small approximately 90 degree hook to freely rest on said eyeglasses nose bridge such that the driving glasses are gravitationally coupled and constrained to the eyeglasses; and, comprises means for adjustments of the vertical location and horizontal leveling of the narrow linear transmissivity region while wearing the glasses; in order to,
   (f) enable the wearer to selectively view oncoming vehicles and headlights through either the narrow linear transivity region, the uniform transmissivity region, or the clear region; and to change from one region to another by a head nod of several degrees accomplished in the time approximating the blink of an eye.

2. The glasses of claim 1 comprising adjustable nose pads utilizing the well known S-shaped, easily formable wire structure joining the nose pads and the frame of said glasses, the nominal width of the narrow linear filter region being 0.07 inches to 0.14 inches; and the attenuation of the narrow linear filter region is nominally 6 db at the upper edge.

3. A set of night driving glasses or screens for reducng the glare experienced during night driving, comprising:
   (a) a frame with integral, adjustable nose pads, and temple pieces;
   (b) a lens set having a plurality of regions of different configurations and different light transmissivities;
   (c) a mechanical coupler to modify the glasses into an attachment for a set of eyeglasses, and;
   (d) said lenses are joined to the frames wherein said regions of different transmissivity are configured and located such that one region comprises a narrow horizontal strip positioned in front of the pupils of a wearers eyes by means of the mechanical coupler, and thence extend horizontally around to the sides of the wearers eyes; and wherein said narrow region varies linearly in transmissivity in a vertical direction from 100% at the lower edge to a significantly lower transmissivity at an upper edge; and further, said region broadens downward in the vicinity of the sides of the eyes to enable protection of the peripheral vision from headlight sidelobe glare experienced when vehicles pass; whilst, a region of the lens immediately above the narrow region is integral and of uniform transmissivity of the same value as the upper edge of the narrow region; and, a region of the lens immediately below the lower edge of the narrow region is void of all lens material and hence of 100% transmissivity; and,
   (e) said mechanical coupler comprises a thin strip of easily formable metal, approximately ¼ inch wide, and wherein one end comprises an array of apertures which function to attach the coupler to the driving glasses via attachment means for tightening at one of a plurality of vertical positions on eyeglass nose bridges by appropriate choice of aperture; and, for which the other end of the metal strip is formed into a small approximately 90 degree hook to freely rest on said eyeglasses nose bridge such that the driving glasses are gravitationally coupled and constrained to the eyeglasses; and, comprises means for adjustments of the vertical location and horizontal leveling of the narrow linear transmissivity region while wearing the glasses; in order to,
   (f) enable the wearer to selectively view oncoming vehicles and headlights through either the narrow linear transivity region, the uniform transmissivity region, or the clear region; and to change from one region to another by a head nod of several degrees accomplished in the time approximating the blink of an eye.

4. The glasses of claim 3 comprising adjustable nose pads utilizing the well known S-shaped, easily formable wire structure joining the nose pads and the frame of said glasses, the nominal width of the narrow linear filter region being 0.07 inches to 0.14 inches; and the attenuation of the narrow linear filter region is nominally 6 db at the upper edge.

* * * * *